US010015609B2

(12) United States Patent
Kropfitsch et al.

(10) Patent No.: US 10,015,609 B2
(45) **Date of Patent: *Jul. 3, 2018**

(54) GLITCH DETECTION AND METHOD FOR DETECTING A GLITCH

(71) Applicant: Infineon Technologies AG, Neubiberg (DE)

(72) Inventors: Michael Kropfitsch, Koettmannsdorf (AT); Jose Luis Ceballos, Villach (AT)

(73) Assignee: INFINEON TECHNOLOGIES AG, Neubiberg (DE)

(*) Notice: Subject to any disclaimer, the term of this patent is extended or adjusted under 35 U.S.C. 154(b) by 0 days.

This patent is subject to a terminal disclaimer.

(21) Appl. No.: 15/614,399

(22) Filed: Jun. 5, 2017

(65) Prior Publication Data

US 2017/0272879 A1 Sep. 21, 2017

Related U.S. Application Data

(63) Continuation of application No. 14/811,536, filed on Jul. 28, 2015, now Pat. No. 9,729,988, which is a continuation of application No. 13/299,098, filed on Nov. 17, 2011, now Pat. No. 9,143,876.

(51) Int. Cl.

| | |
|---|---|
| ***H04R 3/00*** | (2006.01) |
| ***H02B 1/00*** | (2006.01) |
| ***H04R 29/00*** | (2006.01) |
| ***H04R 19/04*** | (2006.01) |
| ***H04R 19/00*** | (2006.01) |
| *H04R 19/01* | (2006.01) |

(52) U.S. Cl.
CPC ............. *H04R 29/004* (2013.01); *H04R 3/00* (2013.01); *H04R 19/005* (2013.01); *H04R 19/04* (2013.01); *H04R 3/007* (2013.01); *H04R 19/016* (2013.01); *H04R 2201/003* (2013.01)

(58) Field of Classification Search
CPC .......... H04R 3/00; H04R 19/01; H04R 19/04; H04R 19/016; H04R 3/007
USPC ......... 327/33-34, 77-78; 381/107, 111-115, 381/120, 123, 174, 58, 91, 92, 122; 330/199
See application file for complete search history.

(56) References Cited

U.S. PATENT DOCUMENTS

| | | | | |
|---|---|---|---|---|
| 3,927,260 | A | 12/1975 | Amundson | |
| 5,119,321 | A | 6/1992 | Burton | |
| 5,563,952 | A | 10/1996 | Mercer | |
| 9,143,876 | B2 * | 9/2015 | Kropfitsch | H04R 19/005 |
| 9,729,988 | B2 * | 8/2017 | Kropfitsch | H04R 29/004 |
| 2002/0188216 | A1 | 12/2002 | Kayyali | |
| 2003/0201777 | A1 | 10/2003 | Gogoi et al. | |
| 2007/0013571 | A1 | 1/2007 | Fujimoto | |
| 2008/0061843 | A1 | 3/2008 | Yanci | |
| 2010/0034031 | A1 | 2/2010 | Kang | |

(Continued)

FOREIGN PATENT DOCUMENTS

| | | | |
|---|---|---|---|
| CN | 102137315 | A | 7/2011 |
| DE | 102004030380 | A1 | 1/2006 |

*Primary Examiner* — Xu Mei
(74) *Attorney, Agent, or Firm* — Slater Matsil, LLP

(57) ABSTRACT

System and method for detecting a glitch is disclosed. An embodiment comprises increasing a bias voltage of a first capacitor, sampling an input signal of a first plate of the first capacitor with a time period, mixing the input signal with the sampled input signal, and comparing the mixed signal with a reference signal.

18 Claims, 3 Drawing Sheets

(56) References Cited

U.S. PATENT DOCUMENTS

| | | | |
|---|---|---|---|
| 2010/0164068 | A1 | 7/2010 | Pennock |
| 2010/0219839 | A1 | 9/2010 | Steele |
| 2010/0310096 | A1 | 12/2010 | Josefsson et al. |
| 2011/0037517 | A1 | 2/2011 | Teplechuk |
| 2011/0110536 | A1 | 5/2011 | Hovesten et al. |
| 2011/0142261 | A1 | 6/2011 | Josefsson |
| 2012/0250910 | A1 | 10/2012 | Shajaan |

* cited by examiner

GLITCH DETECTION AND METHOD FOR DETECTING A GLITCH

CROSS-REFERENCE TO RELATED APPLICATIONS

This application is a continuation of U.S. application Ser. No. 14/811,536, entitled "Glitch Detection and Method for Detecting a Glitch," filed Jul. 28, 2015, which application is a continuation of U.S. application Ser. No. 13/299,098, entitled "Glitch Detection and Method for Detecting a Glitch," filed Nov. 17, 2011, now U.S. Pat. No. 9,143,876 issued Sep. 22, 2015, which applications are incorporated herein by reference in their entirety.

TECHNICAL FIELD

The present invention relates generally to semiconductor circuits and methods, and more particularly to a glitch detection circuit.

BACKGROUND

Audio microphones are commonly used in a variety of consumer applications such as cellular telephones, digital audio recorders, personal computers and teleconferencing systems. In particular, lower-cost electret condenser microphones (ECM) are used in mass produced cost sensitive applications. An ECM microphone typically includes a film of electret material that is mounted in a small package having a sound port and electrical output terminals. The electret material is adhered to a diaphragm or makes up the diaphragm itself. Most ECM microphones also include a preamplifier that can be interfaced to an audio front-end amplifier within a target application such as a cell phone. The output of the front-end amplifier can be coupled to further analog circuitry or to an A/D converter for digital processing. Because an ECM microphone is made out of discrete parts, the manufacturing process involves multiple steps within a complex manufacturing process. Consequently, a high yielding, low-cost ECM microphone that produces a high level of sound quality is difficult to achieve.

SUMMARY

These and other problems are generally solved or circumvented, and technical advantages are generally achieved, by embodiments of the invention.

In accordance with an embodiment of the present invention, a method for detecting a glitch comprises increasing a bias voltage of a first capacitor, sampling an input signal of a first plate of the first capacitor with a time period, mixing the input signal with the sampled input signal, and comparing the mixed signal with a reference signal.

In accordance with an embodiment of the present invention, a method for calibrating a microphone comprises operating the microphone in a normal operation mode based on a first bias voltage, and activating a calibration mode. The method further comprises operating the calibration mode, wherein the calibration mode comprises increasing a bias voltage of a first capacitor, sampling an input signal of a first plate of the first capacitor with a time period, calculating an output signal from the sampled input signal and the input signal, and comparing the calculated output signal with a reference signal.

In accordance with an embodiment of the present invention, a circuit comprises an input terminal configured to receive an input signal, a first summer configured to calculate an output signal, the first summer configured to receive the input signal and a sampled input signal, the sampled input signal being based on the input signal, a comparator configured to compare the calculated output signal with a reference signal, and an output terminal configured to provide the compared signal.

In accordance with an embodiment of the present invention, a circuit comprises a MEMS system, a glitch detection circuit, and a switch, the switch electrically connected to the MEMS system and to the glitch detection circuit.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to embodiments in a specific context, namely a microphone. The invention may also be applied, however, to other types of systems such as audio systems, communication systems, or sensor systems.

In a condenser microphone or capacitor microphone, a diaphragm or membrane and a backplate form the electrodes of a capacitor. The diaphragm responds to sound pressure levels and produces electrical signals by changing the capacitance of the capacitor.

The capacitance of the microphone is a function of the applied bias voltage. At zero bias voltage the microphone exhibits a small capacitance and at higher bias voltages the microphone exhibits increased capacitances. The capacitance of the microphone as a function of the bias voltage is not linear. Especially at distances close to zero the capacity increases suddenly.

A sensitivity of a microphone is the electrical output for a certain sound pressure input (amplitude of acoustic signals). If two microphones are subject to the same sound pressure level and one has a higher output voltage (stronger signal amplitude) than the other, the microphone with the higher output voltage is considered having a higher sensitivity.

The sensitivity of the microphone may also be affected by other parameters such as size and strength of the diaphragm, the air gap distance, and other factors.

In one embodiment a glitch in a microphone system is detected using a glitch detection circuit. The glitch detection circuit may sample an input signal and may add, subtract or compare the sampled input signal with an instantaneous or momentary input signal. The added, subtracted or compared signal is then compared to a reference signal.

In one embodiment the glitch detection circuit is integrated in the microphone system. In one embodiment, the glitch detection circuit is connected to the microphone system via a switch. In one embodiment the switch is switched ON when the microphone system is in a calibration mode, otherwise the switch is switched OFF. In one embodiment the microphone system the normal operation mode of the microphone system is deactivated when the microphone system is in a calibration mode.

Figure 1:
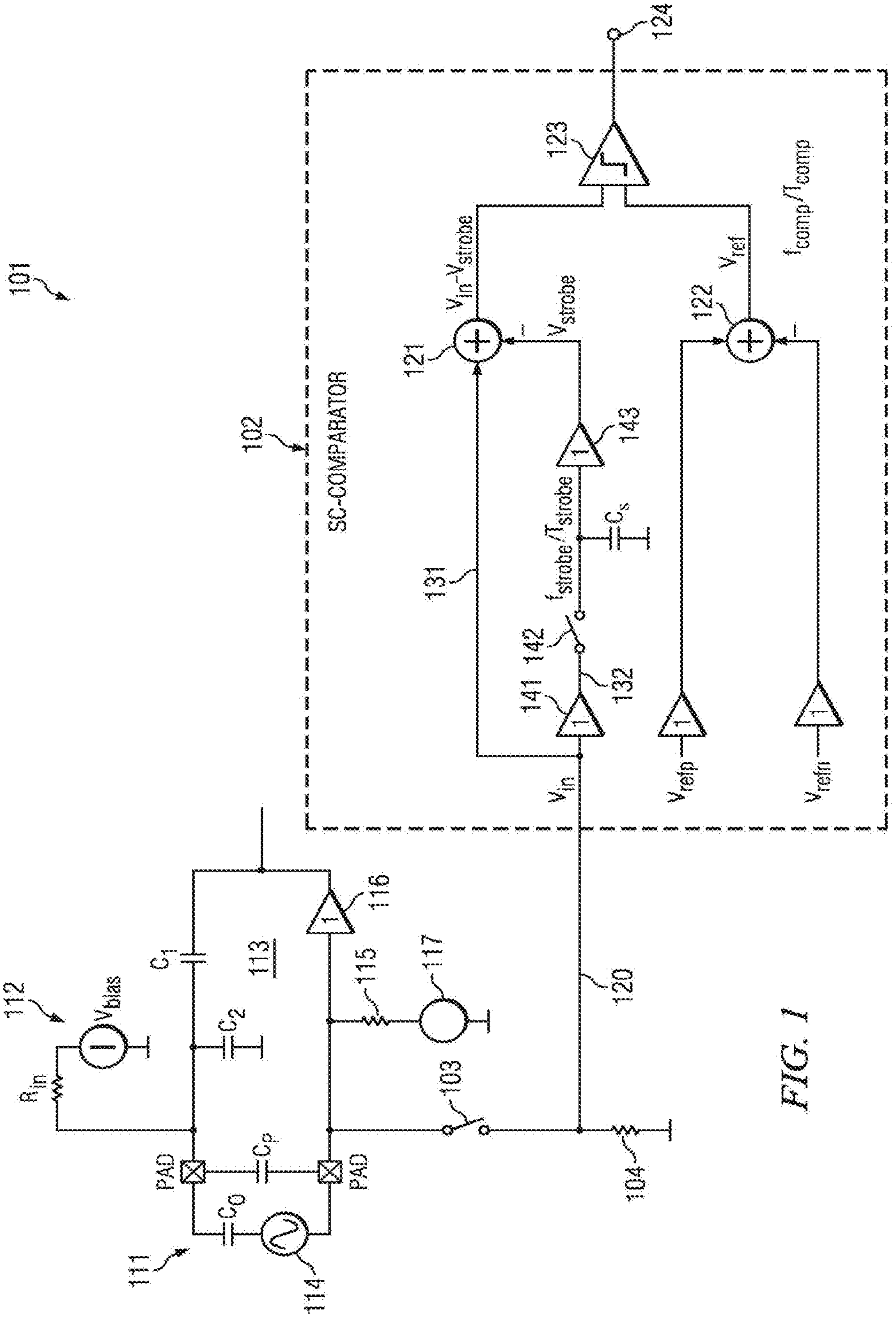
FIG. 1 shows an embodiment of a glitch detection circuitry.

FIG. 1 shows an equivalent circuit of a microphone system 101 and a glitch detection circuit 102. The glitch detection circuit 102 may be a switched capacitor comparator (SC-comparator). The microphone system 101 is connected to the glitch detection circuit 102 via switch 103. The glitch detection circuit 102 is used to detect a glitch when the microphone system 101 is operated in a calibration mode. If the microphone system 101 is calibrated the switch 103 is closed or in an ON state; otherwise the switch 103 is open or in an OFF state. In one embodiment the microphone system 101 is calibrated when the operation mode of the microphone system 101 is deactivated.

The microphone system 101 comprises a microphone or MEMS device 111, a charge pump 112, and an amplifier 113. The microphone 111 is shown as voltage source 114 and capacitors $C_o$ and $C_p$. The charge pump 112 is shown as voltage source $V_{bias}$ and resistor $R_{in}$. In one embodiment, the amplifier 113 is shown as buffer 116, resistor $R_{bias}$ 115, voltage source 117 and feedback gain arrangement $C_1$ and $C_2$. In one embodiment the feedback gain is larger than 1. For example, the gain can be calculated as gain$=1+C_1/C_2$. The buffer 116 may be a voltage buffer or a boosted gain source follower, for example. In other embodiments the amplifier 113 may comprise different circuit arrangements.

The microphone system 101 may be arranged on a single chip. Alternatively, the microphone system 101 may be arranged on two or more chips. For example, the microphone 111 is arranged on a first chip and the amplifier 113, the charge pump 112 and the glitch detection circuit 102 are arranged on a second chip.

In one embodiment the glitch detection circuit 102 comprises a first summer 121 and a second summer 122. The first summer 121 is configured to calculate an output signal. For example, the first summer 121 is configured to receive an input signal at an input and a sampled input signal at the inverting input. The first summer 121 subtracts the sampled input signal from the input signal. The input signal may be an instantaneous or momentary signal. The input signal may be a voltage $V_{in}$ and the sampled input signal may be a sampled voltage $V_{strobe}$. Depending on the configuration, the first summer 121 can also add the input signal to the sampled input signal or subtract the input signal from the sampled input signal.

The second summer 122 is configured to calculate a reference signal. For example, the second summer 122 is configured to receive a first reference signal at the input and a second reference signal at an inverting input. The second summer 122 subtracts the second reference signal from the first reference signal. Depending on the configuration, the second summer 122 can also add the first reference signal to the second reference signal or subtract the first reference signal from the second reference signal.

The first summer 121 is electrically connected to a comparator 123 and the second summer 122 is electrically connected to the comparator 123. The comparator 123 compares the calculated output signal from the first summer 121 with the reference signal from the second summer 122.

The comparator 123 compares the calculated output signal and the reference signal with a time period $T_{comp}$ (or a related clock rate $f_{comp}$), wherein the time period $T_{comp}$ is a time in the range of about 1 μs to about 5 μs. The comparator 123 is electrically connected to an output terminal 124. The output terminal 124 is configured to provide an output signal or glitch detection signal.

The glitch detection circuit 102 further comprises an input terminal 120 which is electrically connected to the first summer 121. The input terminal 120 is electrically connected to the first summer 121 via line 131 and via line 132. Line 132 comprises a first buffer 141, a switch 142 and a second buffer 143. A capacitor $C_s$ is connected to line 132. An advantage of the buffers is that the charge in the sample capacitor $C_s$, is unchanged and that the output impedance for the summer is low and not high.

The input signal is sampled over line 132 and stored in the capacitor $C_s$. The input signal is sampled with a time period $T_{strobe}$ (or related frequency $f_{strobe}$) by the switch 142. The time period $T_{strobe}$ may be shorter than a time period of a glitch ($T_{glitch}$). The time period $T_{strobe}$ may be a time between about 10 μm and about 30 μm. The first reference signal may be a first reference voltage $V_{ref-p}$ and the second reference signal may be a second reference voltage $V_{ref-n}$. The second summer 122 may subtract the second reference voltage $V_{ref-n}$ from the first reference voltage $V_{ref-p}$ to provide the reference voltage $V_{ref}$. An advantage of a differential structure may be that it is insensitive against disturbances coming from positive or negative supply lines. In an alternative embodiment, the reference signal may be a single reference signal. If the reference signal is a single reference signal, the second summer 122 can be omitted.

In one embodiment the switch 103 is connected to ground via the resistor $R_{cal}$ 104. The resistor $R_{cal}$ 104 may have a resistance between about 100 kΩ, and about 10 MΩ. The resistor $R_{cal}$ 104 may have a specific resistance value or resistance range. The resistor $R_{cal}$ 104 may have substantially lower impedance than the resistor $R_{bias}$ 115. In one example, the resistor $R_{bias}$ 115 has a resistance in the GΩ range, e.g., 400 GΩ, while the resistor $R_{cal}$ 104 may have a resistance in the MΩ range, e.g. 1 MΩ. The resistor $R_{cal}$ 104 may have low impedance in order to carry out the calibration of the microphone 101 within a reasonable time frame.

In one embodiment, the charge pump 112 increases the bias voltage $V_{bias}$ between the membrane and the backplate of the microphone or MEMS device 111. The input from the backplate to the glitch detection circuit 102 is connected to ground and bypass the high input impedance of the amplifier 113. Alternatively, an implementation with other bias voltages is also possible. The input voltage $V_{in}$ is sampled with the time period $T_{strobe}$ and stored at the capacitor $C_s$ along line 132. The continuous input voltage $V_{in}$ is subtracted from the sampled input voltage $V_{strobe}$. The difference is compared with a reference voltage $V_{ref}$ in a SC-comparator using the frequency $f_{comp}$. If the difference between the input voltage $V_{in}$ and the sampled input voltage $V_{strobe}$ is bigger than the reference voltage $V_{ref}$, a glitch occurred.

Figure 2A:
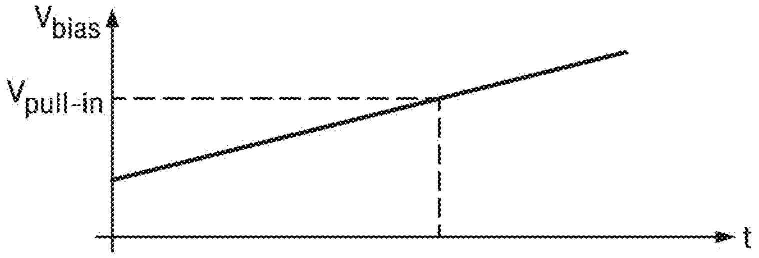
FIGS. 2*a*-2*e* show functional diagrams.
Figure 2B:
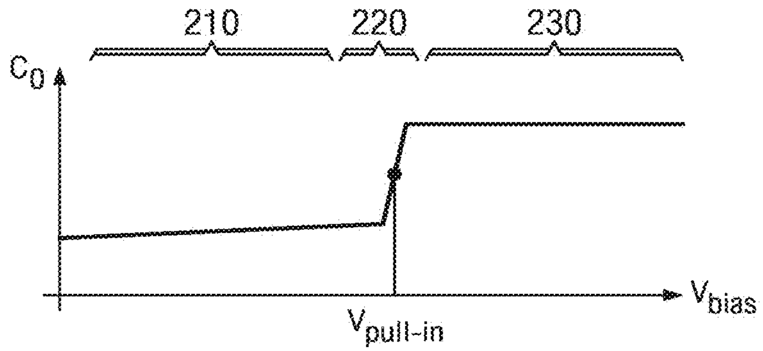

FIGS. 2*a*-2*e* show different functional diagrams. FIG. 2*a* shows a diagram wherein the vertical axis corresponds to the bias voltage $V_{bias}$ and the horizontal axis represents the time t. In a MEMS calibration process, the bias voltage $V_{bias}$ may be increased in a linear fashion over time. Alternatively, the bias voltage $V_{bias}$ may be increased according to another function. The pull-in voltage $V_{pull-in}$ is marked with the dashed line. FIG. 2*b* shows a diagram wherein the vertical axis corresponds to the capacity of the MEMS $C_o$ and the horizontal axis corresponds to the voltage $V_{bias}$ (e.g., $V_{bias}$=vmic−vinpm). The graph in FIG. 2*b* shows the form of a step. The capacitance of the MEMS $C_o$ barely changes in the first region 210. The first region 210 represents the situation where the calibration voltage is below the pull-in voltage $V_{pull-in}$. In the second region 220, near or around the pull-in voltage $V_{pull-n}$, the capacitance of the MEMS increases dramatically. The capacitance change depends on the MEMS type. In a particular example, the capacitance of the MEMS may change in the range of about 1 pF. Larger and smaller changes are also possible. In a third region 230, above the pull-in voltage $V_{pull-in}$, the capacitance of the MEMS does not change (or only changes minimally) even if the calibration voltage is increased.

Figure 2C:
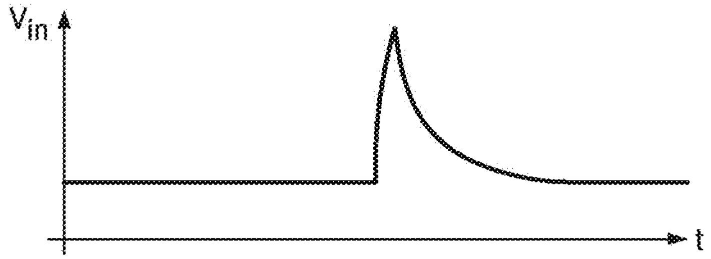
Figure 2D:
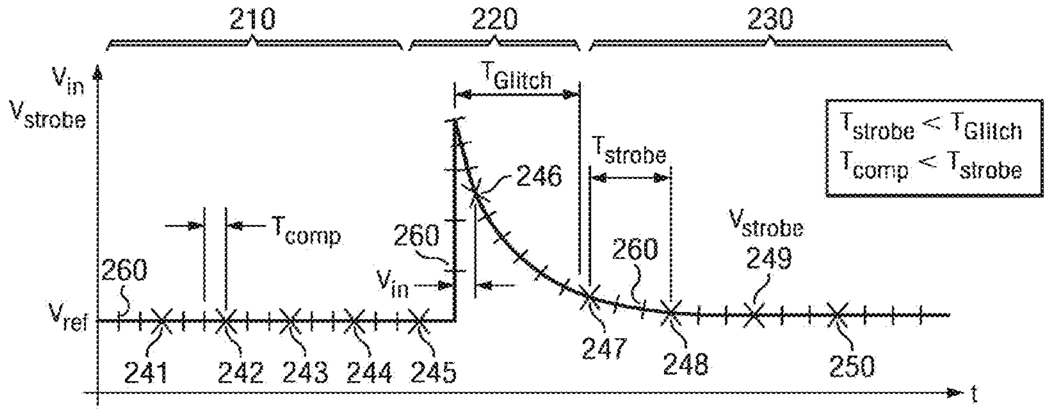

FIG. 2*c* shows a diagram wherein the y-axis corresponds to the input voltage from the back-plate $V_{in}$ and wherein the time t is plotted along the x-axis. As can be seen from FIG. 2*c*, the graph of the input signal $V_{in}$ of the backplate of the MEMS jumps or increases at the time the backplate touches the membrane. The voltage $V_{in}$ decreases thereafter. The graph of the input voltage $V_{in}$ is sampled using time intervals $T_{strobe}$. The sample voltage points $V_{strobe}$ of the sampled input voltage at the time intervals $T_{strobe}$ are stored in the capacitor $C_s$. The sample voltage points $V_{strobe}$ are marked as points 241-250 in FIG. 2*d*. The sampled voltage points $V_{strobe}$ are subtracted from the input voltage $V_{in}$. As shown in FIG. 2*d*, the difference between the $V_{strobe}$ at the points 241-245 in the first region 210 and the input voltage $V_{in}$ is zero. Similarly, the difference between $V_{strobe}$ at the points 248-250 in the third region 230 and the input voltage $V_{in}$ is zero (or almost zero). However, in the second region 220 the difference between $V_{strobe}$ and the input voltage $V_{in}$ is negative or positive as can be seen in FIG. 2*e*.

Figure 2E:
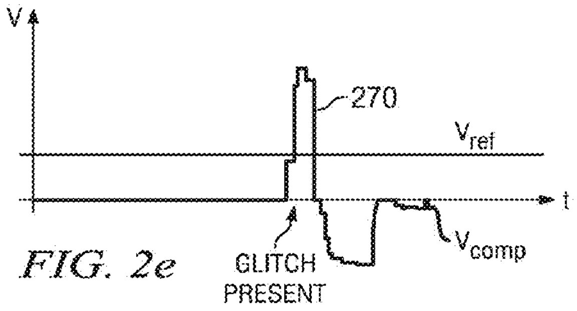

Graph 270 in FIG. 2*e* shows the resulting graph of comparing $V_{strobe}$ with $V_{in}$. As can be seen from FIG. 2*e*, graph 270 peaks when the two capacitor plates touch each other. Graph 270 is compared to a reference voltage $V_{ref}$. The reference voltage $V_{ref}$ may be a predetermined voltage value or a positive voltage value. If graph 270 jumps above the reference voltage $V_{ref}$, a glitch is present. The reference voltage $V_{ref}$ should guarantee that the detected glitch actually corresponds to a glitch and that an error in detecting the glitch is avoided. The glitch may be detected using the glitch detection circuit 102 shown in FIG. 1.

Figure 3:
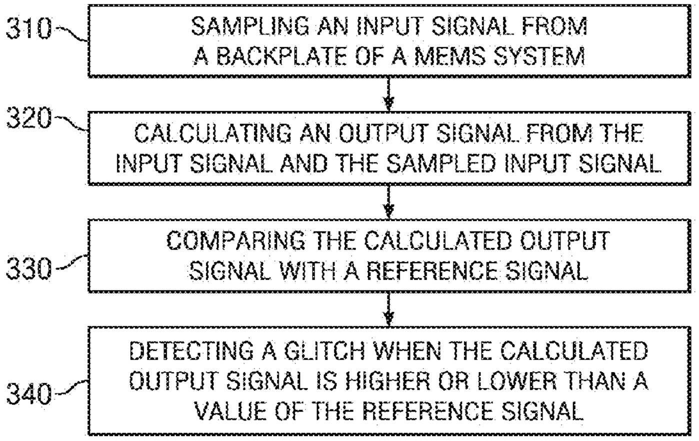
FIG. 3 shows a flow chart of a method to detect a glitch.

FIG. 3 shows a flowchart of an embodiment of the invention. In step 310, an input signal from a back-plate of a microphone system is sampled. In step 320, the first summer calculates an output signal from the input signal and the sampled input signal. For example, a difference between the input signal and the sampled input signal is calculated. In step 330, the calculated out signal is compared to a reference signal. In step 340, a glitch is detected when the calculated output signal is higher or lower than a predetermined threshold value of the reference signal.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A circuit comprising:

a glitch detection circuit comprising a comparator coupled to an input of the glitch detection circuit, the glitch detection circuit configured to detect a signal glitch at the input of the glitch detection circuit and produce a glitch detection signal at an output of the glitch detection circuit via the comparator when the signal glitch is detected; and a switch having a controllable conductive path configured to be electrically connected between a first terminal configured to be coupled to a MEMS transducer and the comparator of the glitch detection circuit, wherein the switch is configured to connect the first terminal to the comparator of the glitch detection circuit when the switch is on, and is configured to disconnect the first terminal from the comparator of the glitch detection circuit when the switch is off.

2. The circuit according to claim 1, wherein the glitch detection circuit further comprises a switched capacitor circuit.

3. The circuit according to claim 1, wherein the switch is electrically connected to ground via a first resistor.

4. The circuit according to claim 3, further comprising a second resistor coupled to the switch, and wherein the first resistor has a resistance between 100 kΩ and 10 MΩ, and the second resistor has resistance of greater than 1 GΩ.

5. The circuit of claim 1, wherein the glitch detection circuit comprises:

a first summer configured to calculate an output signal, receive an input signal from the input to the glitch detection circuit, receive a sampled input signal, the sampled input signal being based on the input signal, and subtract the sampled input signal from the received input signal to form an output signal; and the comparator is configured to generate the glitch detection signal by comparing the calculated output signal with a reference signal.

6. A method of operating a circuit, the method comprising:

electrically connecting a signal node of a first system to a comparator of a glitch detection circuit using a switch during a first mode, the first system comprising a first capacitor having a capacitance proportional to a pressure level;

detecting a signal glitch on the signal node of the first system using the glitch detection circuit;

using the comparator, generating a glitch detection signal at an output of the glitch detection circuit based on the detecting; and electrically disconnecting the signal node of the first system from the comparator of the glitch detection circuit using the switch during a second mode.

7. The method of claim 6, wherein the first mode comprises a calibration mode and the second mode comprises a normal operation mode.

8. The method of claim 7, wherein the calibration mode comprises:

increasing a bias voltage of the first capacitor;

sampling an input signal of a first plate of the first capacitor with a time period;

calculating an output signal from the sampled input signal and the input signal; and comparing the calculated output signal with a reference signal.

9. The method of claim 6, further comprising electrically connecting the first capacitor to ground via a first resistor using the switch during the first mode.

10. The method of claim 6, further comprising:

generating a signal at the signal node using a MEMS transducer; and amplifying the signal using an amplifier of the glitch detection circuit coupled between the signal node and the comparator, wherein the switch is connected between the signal node and an input of the amplifier.

11. The method of claim 6, further comprising:

receiving an input signal from signal node of the first system to form a received signal;

sampling the received input signal to form a sample signal;

subtract the sampled signal from the received signal to form an output signal; and using the comparator, comparing the output signal with a reference signal to form the glitch detection signal.

12. A circuit comprising:

a first plate terminal configured to be coupled to a first plate of a first capacitor;

a second plate terminal configured to be coupled to a second plate of the first capacitor;

a first circuit comprising an amplifier configured to be coupled to the first plate terminal and configured to amplify an input signal from the first plate terminal, and a charge pump circuit coupled to the second plate terminal and configured to apply a bias voltage to the first capacitor via the second plate terminal;

a switch coupled to the first plate terminal; and a second circuit coupled to the first plate terminal through the switch, wherein the second circuit comprises a sampling circuit coupled to the first plate terminal via the switch and configured to generate a sampled signal by sampling the input signal with a sampling time period when the switch is conducting, a subtractor coupled to the first plate terminal via the switch and coupled to the sampling circuit, wherein the subtractor is configured to generate a subtracted signal by subtracting the sampled signal from the input signal when the switch is conducting, a reference circuit configured to generate a reference signal, and a comparator coupled to the reference circuit and the subtractor, wherein the comparator is configured to compare the reference signal with the subtracted signal.

13. The circuit of claim 12, wherein the first plate of the first capacitor comprises a backplate of a microelectromechanical systems (MEMS) microphone and a second plate of the first capacitor comprises a membrane of the MEMS microphone.

14. The circuit of claim 12, wherein the sampling circuit comprises a switched sampling capacitor.

15. The circuit of claim 14, wherein the sampling circuit further comprises a first buffer coupled to an input of the switched sampling capacitor, and a second buffer coupled to an output of the switched sampling capacitor.

16. The circuit of claim 12, wherein the second circuit comprises a glitch detection circuit configured to detect a glitch and an output of the comparator indicates an absence or presence of a detected glitch.

17. The circuit of claim 16, wherein the charge pump circuit is configured to increase the bias voltage until the glitch detection circuit detects a glitch.

18. The circuit of claim 16, wherein a glitch occurs with a glitch time period, and wherein the sampling time period is shorter than the glitch time period.

* * * * *